United States Patent
Stevenson et al.

(10) Patent No.: US 6,742,642 B1
(45) Date of Patent: Jun. 1, 2004

(54) TORQUE-TRANSMITTING TORQUE TO THRUST APPLY MECHANISM HAVING AMPLIFIED THRUST

(75) Inventors: Paul D. Stevenson, Ann Arbor, MI (US); Clinton E. Carey, Monroe, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/303,530

(22) Filed: Nov. 25, 2002

(51) Int. Cl.⁷ .................... F16D 15/00; F16D 28/00
(52) U.S. Cl. ................. 192/54.52; 192/84.6; 192/84.7; 192/93 A
(58) Field of Search .............. 192/84.6, 84.7, 192/54.52, 93 A, 20; 188/72.2, 72.7, 162; 475/154, 269

(56) References Cited

U.S. PATENT DOCUMENTS

| | | | |
|---|---|---|---|
| 2,827,994 A | * 3/1958 | Tiedeman et al. | 192/93 A |
| RE36,502 E | * 1/2000 | Organek et al. | 192/54.52 |
| 6,460,677 B1 | * 10/2002 | Roscoe | 192/84.7 |
| 6,571,928 B1 | * 6/2003 | Gassmann | 192/93 A |
| 6,578,693 B2 | * 6/2003 | Mayr | 192/84.6 |
| 2003/0094343 A1 | * 5/2003 | Showalter | 192/84.7 |

* cited by examiner

Primary Examiner—Rodney H. Bonck
(74) Attorney, Agent, or Firm—Leslie C. Hodges

(57) ABSTRACT

A torque-to-thrust apply mechanism for a torque-transmitting mechanism includes an input electric motor supplying torque to a first rotary to thrust ball and ramp mechanism which converts rotary motion to an apply force between an apply plate and a plurality of friction discs within a torque-transmitting mechanism. The mechanism also includes a second rotary-to-thrust mechanism which receives input rotation from the first apply member as a result of reaction torque. The rotation of the second mechanism results in additional thrust on the friction plates to amplify the apply force of the torque-to-thrust apply mechanism.

5 Claims, 2 Drawing Sheets

TORQUE-TRANSMITTING TORQUE TO THRUST APPLY MECHANISM HAVING AMPLIFIED THRUST

TECHNICAL FIELD

This invention relates to torque-transmitting apply mechanisms and, more particularly, to thrust apply mechanisms incorporating ball ramp mechanisms.

BACKGROUND OF THE INVENTION

A majority of prior art torque-transmitting mechanisms employ hydraulic apply systems wherein a fluid-operated piston is pressurized with hydraulic fluid to apply axial thrust to a plurality of friction discs thereby transmitting torque between two members of the torque-transmitting mechanism. These hydraulic systems require fluid passages to be formed in the transmission housing and requires a somewhat complicated valving mechanism to ensure the proper interaction of the hydraulic fluid with the devices to be controlled.

More recently, electromagnetic apply clutches have been suggested and viscous clutches have also been employed. A more recent event is the introduction of ball ramp or roller ramp apply mechanisms, which convert electric motor torque to axial thrust to establish the frictional engagement between adjacent torque-transmitting friction plates.

SUMMARY OF THE INVENTION

It is an object of the present invention to provide an improved torque-transmitting engagement mechanism.

In one aspect of the present invention, an electric motor torque is converted to an axial thrust, in a torque to thrust mechanism which in turn applies engagement force to a torque-transmitting mechanism.

In another aspect of the present invention, an electric motor supplies rotary torque to a ball and ramp system, which converts the rotary torque to an axial thrust force.

In yet another aspect of the present invention, the axial thrust force of the ball ramp system is initiated by a first ball ramp mechanism forcing frictional engagement between friction plates of a torque-transmitting mechanism.

In yet still another aspect of the present invention, axial movement of the initiating ball ramp also results in rotary movement of a second ball ramp, which in turn produces additional thrust on the torque-transmitting mechanisms to provide full engagement of the torque-transmitting mechanism.

DESCRIPTION OF THE EXEMPLARY EMBODIMENTS

Figure 1:
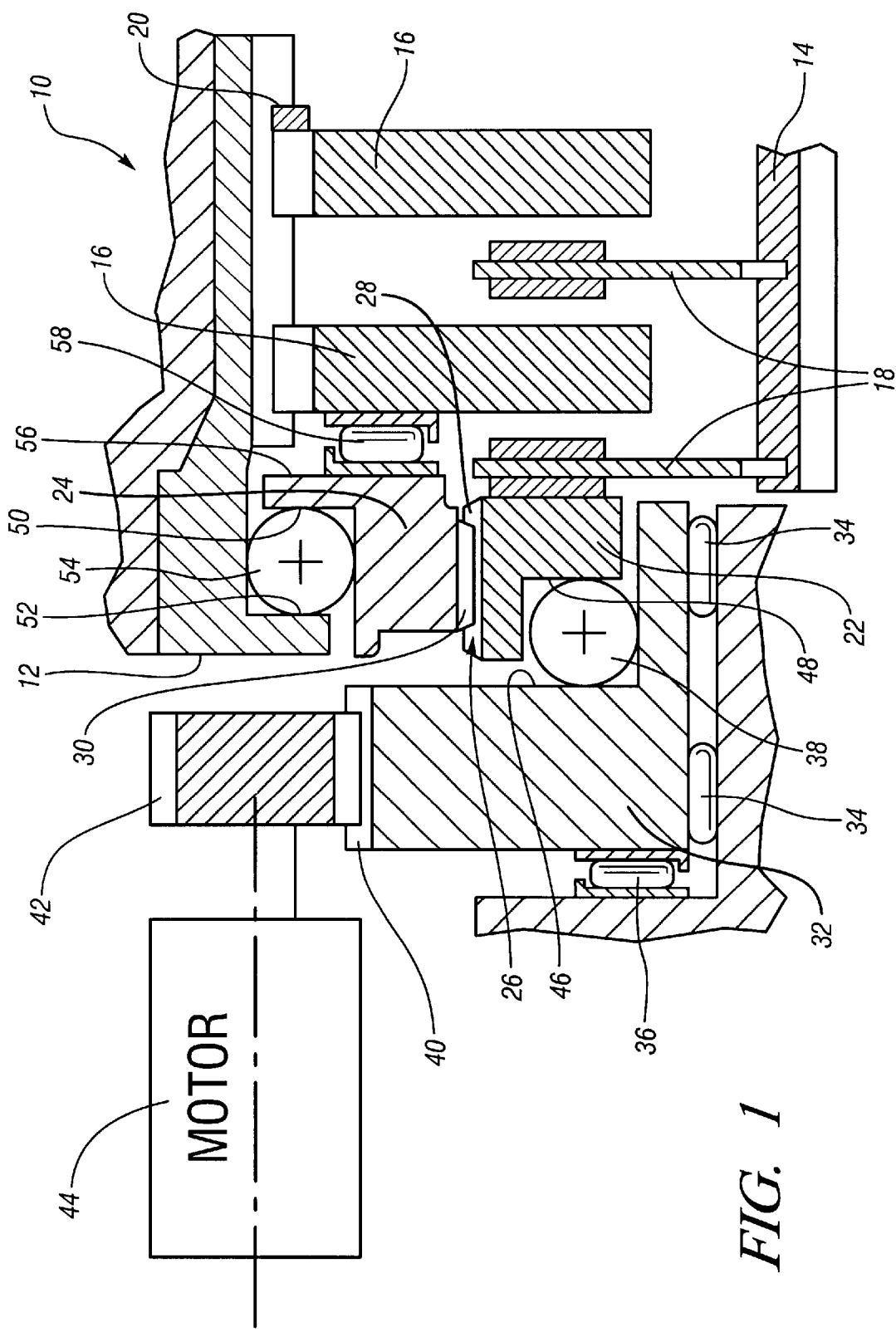
FIG. 1 is a cross-sectional elevational view of a torque-transmitting mechanism, incorporating the present invention within a power transmission.

Referring to the drawings, wherein like characters represent the same or corresponding parts throughout the several views, there is seen in FIG. 1 a torque-transmitting mechanism, generally designated 10, which is a component of a power transmission, not shown. The torque-transmitting mechanism 10 includes a stationary housing portion 12, a rotating hub portion 14, a first plurality of friction plates or discs 16, and a second plurality of friction plates or discs 18. The friction plates 18 are interdicted with the friction plates 16. The friction plates 16 are splined to the stationary housing 12 and limited in rightward movement, as seen in FIG. 1, by a conventional locking ring 20. The friction discs 18 are splined to the hub 14 and are free to move axially thereon between the friction plates 16.

The torque-transmitting mechanism 10 also includes a first annular apply plate 22 and a second annular apply plate 24. The annular apply plate 24 is splined to the annular apply plate 22 at 26 wherein a spline 28 is formed on the apply plate 22 and a spline 30 is formed on the apply plate 24. The apply plate 22 is rotatably supported on an input member 32, which is in turn rotatably supported on a plurality of needle bearings 34 and also supported by a thrust bearing 36.

The apply plate 22 and input member 32 are separated by a plurality of balls or spheres or cylindrical rollers 38. The input member 32 has splined on the outer periphery thereof a gear 40 which meshes with a gear 42 which in turn is rotatably driven by an electric motor 44. The input member 32 has formed thereon an axially displacing annular ramp face 46 and the apply member 22 has formed thereon a flat side face 48. The balls or spheres or cylindrical rollers 38 abut the faces 46 and 48.

Figure 2:
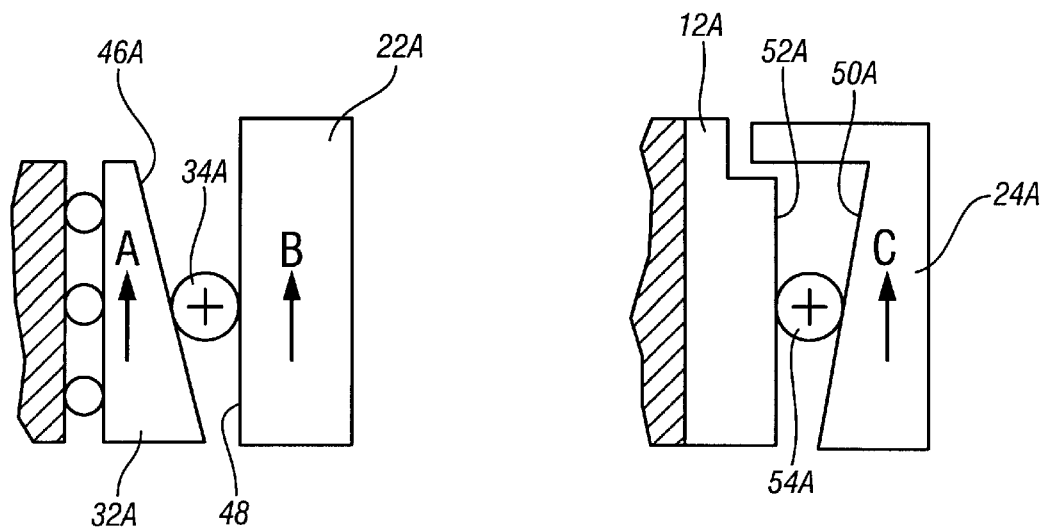
FIG. 2 is a block diagram representation of a portion of the torque-transmitting apply mechanism shown in FIG. 1.

As seen in FIG. 2, the input member 32A has an axially displacing annular ramp face 46A and the apply plate 22A has a flat side face 48A. The apply plate 24 has an axial ramp surface 50 and the housing 12 has formed thereon an axial surface or reaction member 52. These surfaces and 50 and 52 are separated by a plurality of spheres or balls or cylindrical rollers 54. As seen in FIG. 2, the surface 52A of the housing 12 is a flat surface and the surface 50A of the apply plate 24A is an axially displacing annular ramp surface. The apply plate 24 also has a second axial surface 56, which is separated from the friction plates 16 by a thrust bearing 58. Thus, the apply plate 24 is capable of applying thrust to the plates 16 while relative rotation therebetween is permitted, and the surface 52 is a reaction surface or member.

When the electric motor 44 is rotated, the input member 32 will also rotate through the gear mesh resulting in further movement of the input member 32 in the direction of Arrow A, as seen in FIG. 2. As the input member 32A rotates in the direction of Arrow A, the spheres 34A will move axially toward the apply plate 22A because of the ramp surface 46A. This will result in axial movement of the apply plate 22A toward the friction plates 18. As the friction plates 18 come into abutment with the friction plates 16, a rotary force in the direction of Arrow B will be imposed upon the apply plate 22 due the rotation of the hub 14. The rotation of the apply plate 22 will be transmitted to the apply plate 24 such that the apply plate 24 will be rotated in the direction of Arrow C.

Due to the ramp surface 50 on apply plate 24 and the spheres 54, the apply plate 24 will be moved axially toward the friction discs 16 to apply additional thrust to the friction plates 16 and 18. When the torque-transmitting mechanism 10 is fully engaged, the relative rotation of discs 18 and discs 16 will cease and both plates will be held stationary or rotate in unison depending upon the type torque-transmitting mechanism. At this point, the maximum torque-to-thrust phenomenon will be completed and the torque-transmitting mechanism 10 is, as stated above, fully engaged.

There are instances under which the torque on the torque-transmitting mechanism 10 will be reversed, which would normally tend to disengage the torque-transmitting mechanism through the ramp applied. However, as long as the electric motor 44 maintains at least one-third to one-half the required thrust on the torque transmitting mechanism, there will be sufficient thrust applied to maintain the torque-transmitting mechanism 10 fully engaged during the coast operation.

In some transmissions, the torque-transmitting mechanism 10 might be employed for two different ratios, for example, an underdrive forward speed ratio and an overdrive forward speed ratio. During the overdrive forward speed ratio, the reaction torque on the hub 14 would be in a direction opposite to the torque during the underdrive ratio. However, the reaction force is considerably less during the overdrive ratio and therefore the electric motor 44 has sufficient torque capability to maintain the torque-transmitting mechanism 10 fully engaged during the reverse torque operation.

Figure 3:
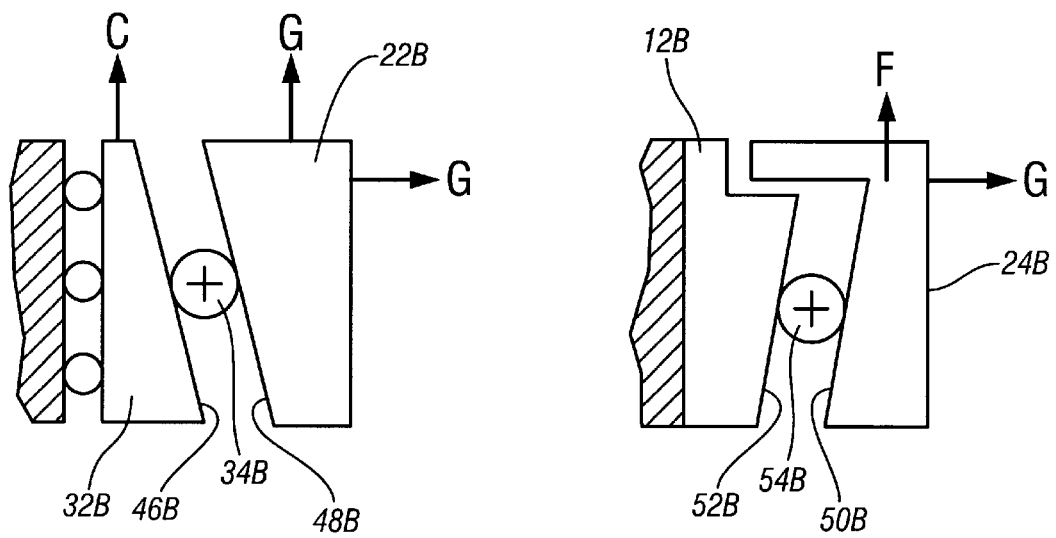
FIG. 3 is a block diagram representation of an alternative embodiment of the thrust mechanism shown in FIG. 2.

An alternative embodiment, shown in FIG. 3, describes the input member 32B as having an annular ramp face 46B and the apply plate 22B having an angular ramp face 48B. In this arrangement, the rotary movement of the input member 32B in the direction of Arrow C will result in further axial movement of the apply plate 22B in the direction of Arrow D thereby shortening the amount of rotation of the electric motor 44 to initiate application of the torque-transmitting mechanism 10.

Also shown in FIG. 3, housing 12B has an axially displacing annular ramp surface 52B instead of a flat face as shown as 52A in FIG. 2. The apply plate 24B also has an axially displacing annular ramp surface 50B. As the apply plate 24B is rotated in the direction of Arrow F, which is a result of the rotation of the apply plate 22B in the direction of Arrow G, the apply plate 24B will be axially moved in the direction of Arrow H as a result of the interaction between the balls 54B and the ramps 52B and 50B. The axial movement of the apply plate 24B will be further for a given amount of rotation than the axial thrust or axial movement of the plate 24A. Again, the apply time for the full engagement of the torque-transmitting mechanism 10 is reduced.

With the present invention, the electric motor 44 supplies sufficient torque to initiate axial thrust of the apply plate 22 and initial engagement of the friction plates 18 and 16. With the initial frictional engagement of the friction plates 18 and 16, the rotation of the hub 14, which is a result of torque reaction, will cause rotation of the apply plate 22. The rotation of the apply plate 22 is transmitted to the apply plate 24 which will therefore rotate in unison with the apply plate 22. The rotation of the apply plate 24 results in additional thrust on the friction plates 16 and 18 such that the torque of the electric motor 44 is amplified by the reaction torque of the torque-transmitting mechanism 10. This, of course, reduces the necessary size and torque output of the electric motor 44 thereby reducing the overall size and weight of the control mechanism.

The gears 40 and 42 are depicted as third gears or helical gears. It is also possible to use other types of gear engagement mechanisms such as converting the gear 40 to a worm gear and the gear 42 to a worm in which case the motor in gear 42 could be displaced ninety degrees to the mechanism shown FIG. 1. These types of gear arrangements are well known to those skilled in the art and can be interchanged with no conflict in the design or operation of the system.

The present invention represents an improved torque-to-thrust apply mechanism for torque-transmitting mechanisms. The torque is presented in a form of rotary motion from an electric motor and the thrust is a result of this torque being transmitted through a plurality of ramp mechanisms to a thrust force, which is utilized to provide the engagement force within the torque-transmitting mechanism.

The above-described system employs spheres, which cooperate with ramp portions to convert the torque input to a thrust output. Other mechanisms for converting the torque-to-thrust might be employed such as lead screws or spiral springs to name a few of the conversion mechanisms to be employed. The preferable roller mechanism is in the form of spheres such as those shown with the embodiment of the present invention. However, those skilled in the art will recognize that other mechanisms are employable within the confines of the present invention.

What is claimed is:

1. A torque-transmitting mechanism comprising:
   a housing;
   a first plurality of friction plates drivingly connected with said housing;
   a hub member;
   a second plurality of friction plates drivingly connected with said hub member and alternately spaced with said first plurality of friction plates;
   a first rotation-to-thrust apply mechanism including a first input member driven by a rotary input mechanism, an axially displaceable first apply member, and a first plurality of roller means operable between said first input member and said first apply member to enforce axial movement of said first apply member toward said friction plates;
   a second rotation-to thrust apply mechanism including a second apply member continuously drivingly connected with said first apply member for rotation therewith and axial movement relative thereto, a reaction member connected with said housing, and a second plurality of roller means operable between said second apply member and said reaction member to enforce axial movement therebetween upon rotation of said second apply member; and
   an axially displacing annular ramp surface formed on said first input member and said second apply member cooperating with said first and second roller means during enforcement of axial movement of both the apply members as a result of rotary input from the rotary input mechanism.

2. The torque-transmitting mechanism defined in claim 1 further comprising:
   said first apply member having an axially displacing annular ramp surface juxtaposed said axially displacing annular ramp surface on said first input member.

3. The torque-transmitting mechanism defined in claim 1 further comprising:
   said reaction member having an axially displacing annular ramp surface juxtaposed an axially displacing annular ramp surface on said second apply member.

4. The torque-transmitting mechanism defined in claim 1 further comprising:
   said first apply member having an axially displacing annular ramp surface juxtaposed said axially displacing annular ramp surface on said first input member; and
   said reaction member having an axially displacing annular ramp surface juxtaposed an axially displacing annular ramp surface on said second apply member.

5. The torque-transmitting mechanism defined in claim 1 further comprising:
   said first apply member being moved axially to initiate frictional engagement of said friction plates and thereby initiate common rotation of both said first apply member and said second apply member.

* * * * *